(12) United States Patent
Seeger

(10) Patent No.: US 8,924,091 B2
(45) Date of Patent: Dec. 30, 2014

(54) INTELLIGENT STUFFER MECHANISM FOR BALER

(75) Inventor: Jason L. Seeger, Newton, KS (US)

(73) Assignee: AGCO Corporation, Duluth, GA (US)

(*) Notice: Subject to any disclaimer, the term of this patent is extended or adjusted under 35 U.S.C. 154(b) by 130 days.

(21) Appl. No.: 13/338,171

(22) Filed: Dec. 27, 2011

(65) Prior Publication Data

US 2012/0221213 A1 Aug. 30, 2012

Related U.S. Application Data

(60) Provisional application No. 61/427,637, filed on Dec. 28, 2010.

(51) Int. Cl.
*A01F 15/00* (2006.01)
*A01F 15/08* (2006.01)
*A01F 15/10* (2006.01)

(52) U.S. Cl.
CPC .......... *A01F 15/0825* (2013.01); *A01F 15/101* (2013.01); *A01F 2015/102* (2013.01)
USPC .................. 701/50; 56/341; 56/502; 100/43; 100/45; 100/51; 100/237; 100/245

(58) Field of Classification Search
CPC ............ A01F 15/07; A01F 2015/0795; A01F 2015/078; A01F 15/101; A01F 15/106
USPC .......... 701/1, 22, 50; 100/179, 237, 245, 280, 100/35, 40, 43, 45, 51, 7, 8; 56/10.2 R, 341, 56/10.2 G
See application file for complete search history.

(56) References Cited

U.S. PATENT DOCUMENTS

| | | | |
|---|---|---|---|
| 4,275,550 A * | 6/1981 | Swenson et al. | 56/341 |
| 5,226,356 A | 7/1993 | Schrag et al. | |
| 5,819,643 A * | 10/1998 | McIlwain et al. | 100/43 |
| 7,104,191 B1 * | 9/2006 | Parker et al. | 100/51 |
| 7,481,158 B2 * | 1/2009 | Gerngross et al. | 100/45 |
| 2001/0042362 A1 * | 11/2001 | Scarlett et al. | 56/10.2 G |
| 2002/0108508 A1 | 8/2002 | Leupe | |
| 2006/0124002 A1 | 6/2006 | Dubois | |
| 2006/0287792 A1 | 12/2006 | Jarrett | |
| 2012/0240797 A1 * | 9/2012 | Verhaeghe et al. | 100/43 |
| 2013/0008324 A1 * | 1/2013 | Verhaeghe et al. | 100/99 |
| 2013/0167739 A1 * | 7/2013 | Herron | 100/35 |

FOREIGN PATENT DOCUMENTS

| | | |
|---|---|---|
| EP | 1769674 A1 | 4/2007 |
| EP | 2232981 A1 | 9/2010 |
| FR | 2863821 A1 | 6/2005 |

OTHER PUBLICATIONS

International Search Report for International Application No. PCT/US2011/067464 dated Apr. 17, 2012.

* cited by examiner

*Primary Examiner* — Helal A Algahaim
*Assistant Examiner* — Jelani Smith

(57) ABSTRACT

An intelligent stuffer trip mechanism is configured to detect a characteristic of a charge within a stuffer chute and actuate the stuffer in response to the characteristic. A user interface may receive desired characteristics of a charge from a user, a sensor may be used to detect characteristics of a charge in a stuffer chute and a controller configured to actuate the stuffer in accordance with a predetermined scheme and the detected characteristics of the charge.

5 Claims, 12 Drawing Sheets

TO CONTROLLER

TO SENSOR

| Crop | Minimum Value | Maximum Value | Optimal Value | Characteristic |
|---|---|---|---|---|
| alfalfa | 200 | 400 | 300 | Pressure |
| alfalfa | 70 | 110 | 100 | Fill Level |
| corn | 300 | 400 | 350 | Pressure |
| corn | 80 | 120 | 100 | Fill Level |
| straw | 280 | 400 | 300 | Pressure |
| straw | 90 | 115 | 100 | Fill Level |
| hay | . | . | . | . |
| hay | . | . | . | . |
| . | . | . | . | . |
| . | . | . | . | . |
| . | . | . | . | . |

INTELLIGENT STUFFER MECHANISM FOR BALER

CROSS-REFERENCE TO RELATED APPLICATIONS

Under provisions of 35 U.S.C. §119(e), Applicant claims the benefit of U.S. Provisional Application No. 61/427,637 filed Dec. 28, 2010, which is incorporated herein by reference in its entirety.

TECHNICAL FIELD

This invention relates to the field of "rectangular" balers and, more particularly, to a system for determining characteristics of a charge of crop materials in a stuffer chute and manipulating the stuffer trip accordingly.

BACKGROUND

A square baler may be driven along a crop windrow to pick up crop material and feed the crop material into a stuffer chute to form a charge for subsequent delivery to a baling chamber where it is compacted by a reciprocating plunger. The characteristics of the charge in the stuffer chute can affect the characteristics of a resulting bale. For example, uneven loading where one side of the charge in the stuffer chute has a greater volume of crop material than another can have an adverse effect on the shape of the resulting bale. Overloading the stuffer chute can result in high stress levels, the shearing of shear bolts of the stuffer drive and other problems. Underloading the stuffer chute leads to poor density and capacity.

Generally, when a continuously reciprocating plunger is employed by a baler the mechanics are such that a window for triggering the stuffing of the charge from the stuffer chute into the baling chamber opens and closes as the plunger moves across an outlet of the stuffer chute and the drive of the stuffer fork rotates through a cycle. Thus, if a charge is not swept from the stuffer chute into the baling chamber during a first open window then additional crop material is added to the charge while awaiting the next open window so that the charge grows in size while awaiting the next open window.

In an attempt to control the triggering of the stuffer, the prior art has employed mechanical trip devices, that employ an either- or trigger, such as a spring-loaded pressure switch, that trips the stuffer whenever a minimum pressure level within the stuffer chamber is reached. While this arrangement is suitable for its intended purpose, it has several drawbacks. For example, if the specific pressure required by the spring trigger is not reached during a first open window then the charge may grow to an undesirably large size by the time the second window opens, so that the stuffer attempts to sweep the larger charge into the baling chamber which can lead to the aforementioned problems. Thus, in some cases it may be more desirable to sweep a small charge that is below a minimum pressure setting than to attempt to sweep a larger charge later.

The prior art devices also do not provide a way to quickly detect problems with a charge in a stuffer chute. Thus, one must often wait until after the charge has been swept into the baling chamber and the bale is formed to discover such problems, which may prove too late to take corrective action with respect to that particular bale. For example, an operator of such prior art devices is provided with little or no information about characteristics of the charge in the stuffer chute thereby making it difficult to identify problems. An operator will likely have to wait until a bale of undesirable quality is formed, or until the shear bolts are sheared to determine that there is a problem with the wrappers of the stuffer chute or that the setting of the spring tension is wrong or driving at improper speed. Furthermore, the prior art arrangements do not provide sufficient information to allow an operator to take an appropriate corrective driving actions, such as changing the approach to a windrow in an effort to improve the charge characteristics. Furthermore, even when adjustments are made to the stuffer it is often difficult for an operator to quickly determine the effect of such adjustments on the charge as the operator is provided little information about the charge during charge formation in the stuffer chute.

In addition, characteristics of the bale in the baling chamber are typically not used in preparing the charge thereby leading to charges that may be undesirable for a particular bale being formed in the baling chamber. For example, when the formation of the bale in the baling chamber is nearly complete, it may be desirable to provide a charge of smaller than normal size to finish the bale to an accurate desired length.

OVERVIEW

Figure 1:
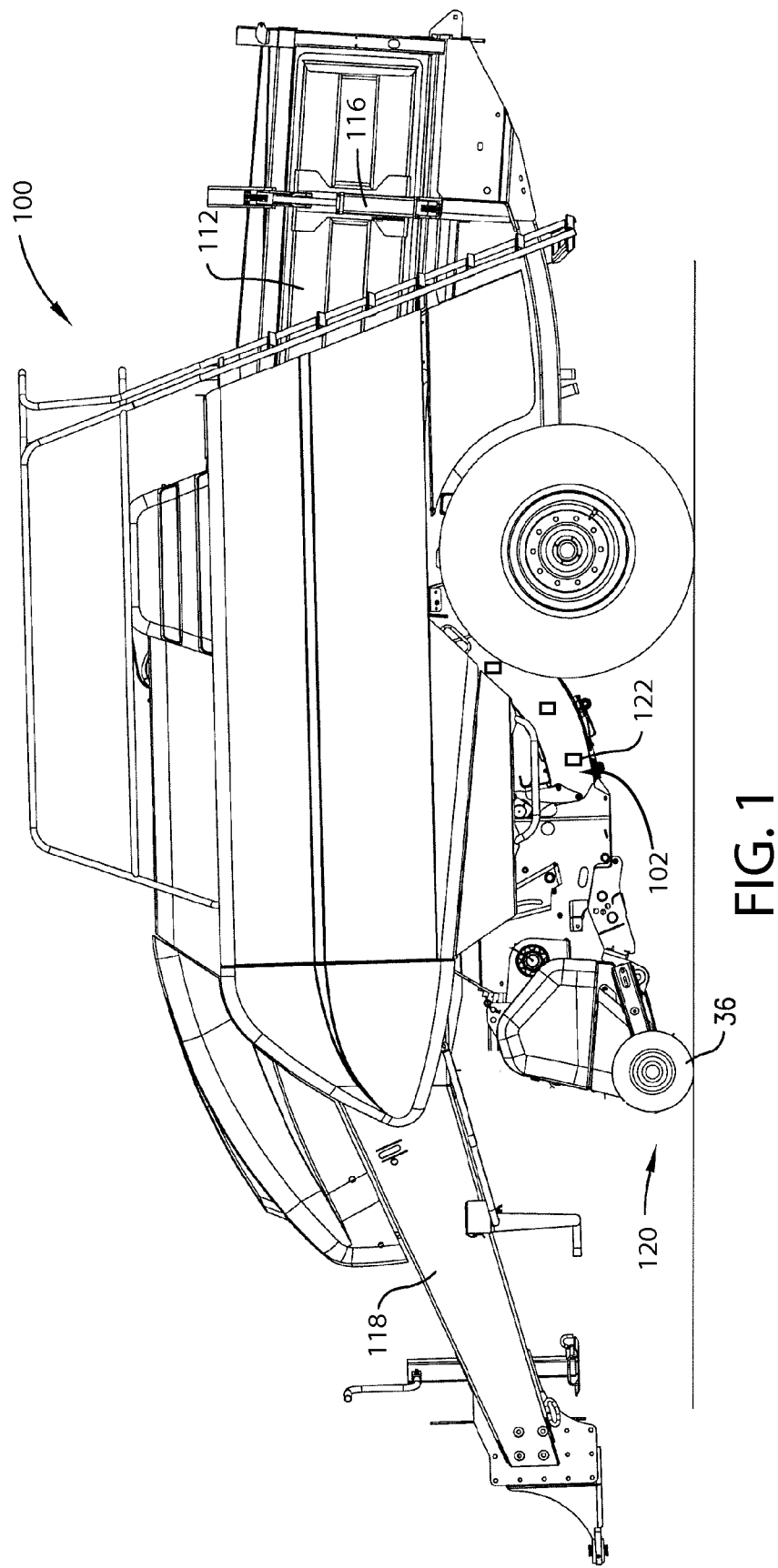
FIG. 1 shows a baler with a smart stuffer mechanism.

In example embodiments a baler is provided with a smart stuffer apparatus. The baler may include an improved stuffer mechanism that determines characteristics of charges forming within a stuffer chute of the baler and controls the activation of the stuffer in response to the characteristics. For example, the stuffer may be paused to allow for more crop material to be added to the charge before sweeping an accumulated charge into the baling chamber in the event that charge does not have desired characteristics or may sweep the current charge into the baling chamber if the charge has a desired characteristic.

The smart stuffer mechanism may determine the size, shape, density, uniformity, etc. of the charge. This data may then be provided to an operator so that various adjustments may be made, such as adjusting the wrappers on the stuffer or changing the operator's driving pattern, to improve characteristics of the charge. The information may also be used to automatically trigger the stuffer mechanism in accordance with a predetermined scheme. In one embodiment, such a scheme may be provided by the operator. For example, an operator may input a desired scheme for triggering the stuffer, such as a scheme customized for a particular crop. Other inputs may also be used by the particular scheme, such as data from other sensors used throughout the baler. In one example embodiment, information regarding the bale length in the baling chamber may be used to determine the desired characteristics of the charge and the stuffer may be manipulated accordingly. For example, a bale length logic may send a signal that only a small charge is needed to complete the bale to a desired length and such smaller charge may be formed and swept into the baling chamber.

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. The drawings are not necessarily to scale and certain elements may have been enlarged or removed so as not to obscure novel aspects of the invention.

For teaching purposes the smart stuffer is hereinafter described in the example embodiments in the context of a large rectangular baler. However, it will be appreciated that the inventive smart stuffer has utility in connection with other types of balers as well. Therefore, it will be understood that notwithstanding the fact that the smart stuffer is hereinafter described in combination with a large rectangular baler, there is no intent to limit the principles of the present invention to any particular type of baler.

In an example embodiment a smart stuffer mechanism comprises: a sensor(s) configured to determine a characteristic of a charge within a stuffer chute; a user input means configured to receive a predetermined scheme for actuating a stuffer associated with the stuffer chute; and a controller configured to actuate the stuffer in accordance with the predetermined scheme. An example method comprises: receiving from an operator a scheme for actuating a stuffer of a stuffer chute; determining whether a charge in the stuffer meets the criteria of the scheme; and actuating the stuffer to sweep the charge into the baling chamber in accordance with the predetermined scheme. The criteria of the scheme may comprise a desired minimum pressure value in the stuffer chute and a desired maximum pressure value in the stuffer chute. The criteria may also comprise a minimum pressure value for a present charge and a maximum value for a future expected charge.

Another example system comprises: one or more sensors configured to determine a characteristic of a charge within a stuffer chute; and a display for displaying the characteristic to an operator. The characteristic may be a pressure within the chute. In another example embodiment the characteristic may be a charge shape. An example method comprises: determining a characteristic of a charge in a stuffer chute; and displaying the characteristic to an operator. In one example embodiment the characteristic is a charge pressure. In another example embodiment the characteristic is a charge shape.

Another example system comprises: a bale sensor configured to determine a characteristic of a bale in a bale forming chamber; a stuffer chute sensor configured to determine a characteristic of a charge in a stuffer chute; and a controller configured to sweep a charge within the stuffer chute in response to the bale characteristic and the charge characteristic. In one example embodiment the bale characteristic is bale length and the charge characteristic is charge size. An example method comprises: determining a characteristic of a bale in a baling chamber; determining a characteristic of a charge within a stuffer chute; and manipulating the charge in the stuffer chute in response to the bale characteristic and the charge characteristic. In one example embodiment, the bale characteristic is a bale length and the charge characteristic is charge size.

DETAILED DESCRIPTION OF EXAMPLE EMBODIMENTS

Turning to the figures, wherein like reference numerals represent like elements throughout the several views, FIG. 1 shows a baler 100 with a smart stuffer system broadly denoted as 102. The baler 100 has a fore-and-aft extending baling chamber denoted generally by reference numeral 112 within which bales of crop material are prepared. In the particular illustrated embodiment, the baler 100 is an "extrusion" type baler in which the bale discharge orifice at the rear of the baler is generally smaller than upstream portions of the chamber such that the orifice restricts the freedom of movement of a previous bale and provides back pressure against which a reciprocating plunger 114 (FIG. 2) within the baler chamber 112 can act to compress charges of crop materials into the next bale. The dimensions of the discharge orifice and the squeeze pressure on the bales at the orifice are controlled by mechanism broadly denoted by reference numeral 116 in FIG. 1. Baler 100 may be hitched to a towing vehicle (not shown) by a tongue 118, and power for operating the various mechanisms of the baler may be supplied by the towing vehicle, such as the vehicle's power takeoff shaft.

The baler 100 may be an "in-line" type of baler as described in U.S. Pat. No. 6,385,952, which is hereby incorporated in its entirety herein, wherein crop material is picked up below and slightly ahead of baling chamber 112 and then loaded up into the bottom of the chamber 112 in a straight line path of travel as viewed in plan. A pickup 120 may be positioned under the tongue 118 on the longitudinal axis of the machine, somewhat forwardly of baling chamber 112. A stuffer chute 122 in which a charge is formed extends generally rearwardly and upwardly from a point behind the pickup 120 to an opening 124 (FIG. 2) in the bottom of the baling chamber 112. The plunger 114 reciprocates within the baling chamber 112 in compression and retraction strokes across the opening 124. When fully retracted, the plunger 114 uncovers the opening 124, and when fully extended, the plunger 114 covers and closes off the opening 124 with the rear face of the plunger 114 disposed somewhat rearwardly beyond the rear extremity of the opening 124.

Figure 2:
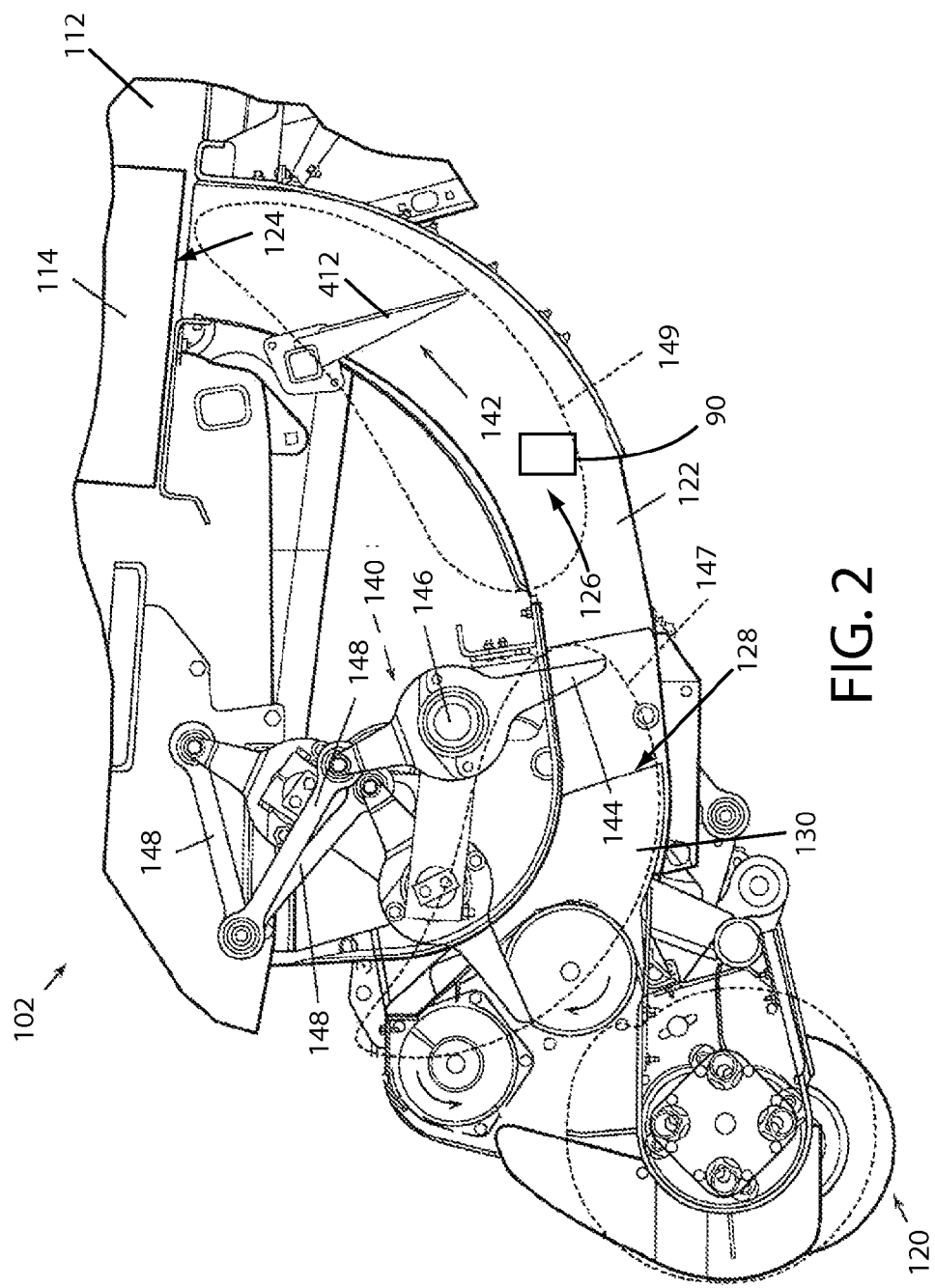
FIG. 2 shows an example embodiment of a smart stuffer mechanism.

As shown in FIG. 2, the stuffer chute 122 defines an internal passage 126 through which crop materials travel from the pickup 120 to the baling chamber 112 during operation of the machine. The front end of the stuffer chute 122 is open to present an inlet 128 into the passage 126, and an outlet for the stuffer chute is defined by the opening 124 into baling chamber 112. A top wall of the stuffer chute 122 may be defined by a series of laterally spaced apart straps 132 (FIG. 3) that extend downwardly and forwardly from the baling chamber 112 and terminate in forwardmost upturned front ends generally above the inlet 128. The pickup 120 may provide crop material to a duct 130 that serves as a pathway for crop flow from the pickup 120 to the stuffer chute 122.

The baler 100 may further comprise a feeding mechanism for moving crop materials through the stuffer chute 122. This arrangement may be similar to that disclosed in U.S. Pat. No. 7,650,741, which is hereby incorporated by reference in its entirety to the extent not incompatible with the present disclosure. Such feeding mechanism may, for example, comprise a suitable rotor associated with a cutter mechanism, or it may comprise other apparatus. In the illustrated embodiment, the feeding mechanism includes a packer broadly denoted by the numeral 140 and a stuffer broadly denoted by the numeral 142. As is conventional and well understood by those skilled in the art, the packer 140 may include a plurality of packing forks 144 that are mounted along a crankshaft 146 and controlled by control links 148 for moving the tips of the packing forks 144 in a generally kidney-shaped path of travel 147 as illustrated in dashed lines in FIG. 2. The packer 140 is thus used to receive crop materials from the pickup 120 and pack the same into the stuffer chute 122 for preparing a precompressed, preshaped charge of crop materials that conforms generally to the interior dimensions of the stuffer chute 122 while the opening 124 is closed by the reciprocating plunger 114 or other means. The stuffer 142 may function to sweep through its own kidney shaped path of travel 149 as illustrated in FIG. 2 to sweep the prepared charge up into the baling chamber 112 between compression strokes of plunger 114 when the opening 124 is uncovered. The foregoing moving components of the baler 100 may be linked by suitable chain drives or the like to be driven from a main power shaft.

Figure 3A:
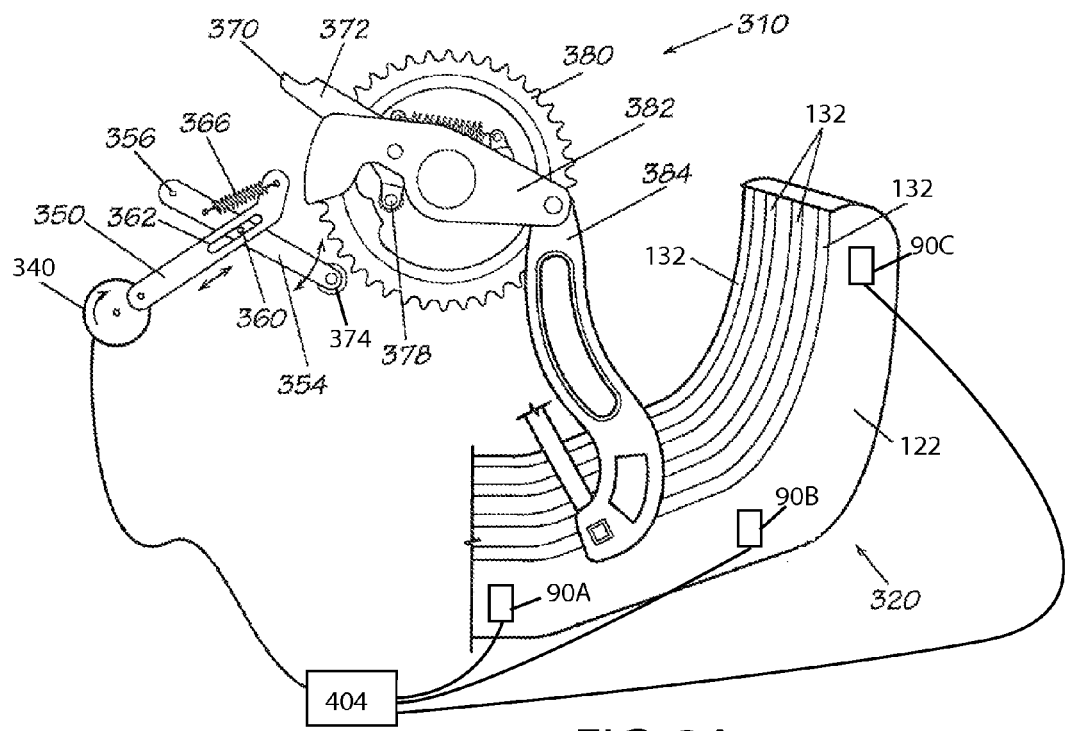
FIGS. 3A-3B shows an example embodiment of a triggering device for use with a smart stuffer mechanism.
Figure 3B:
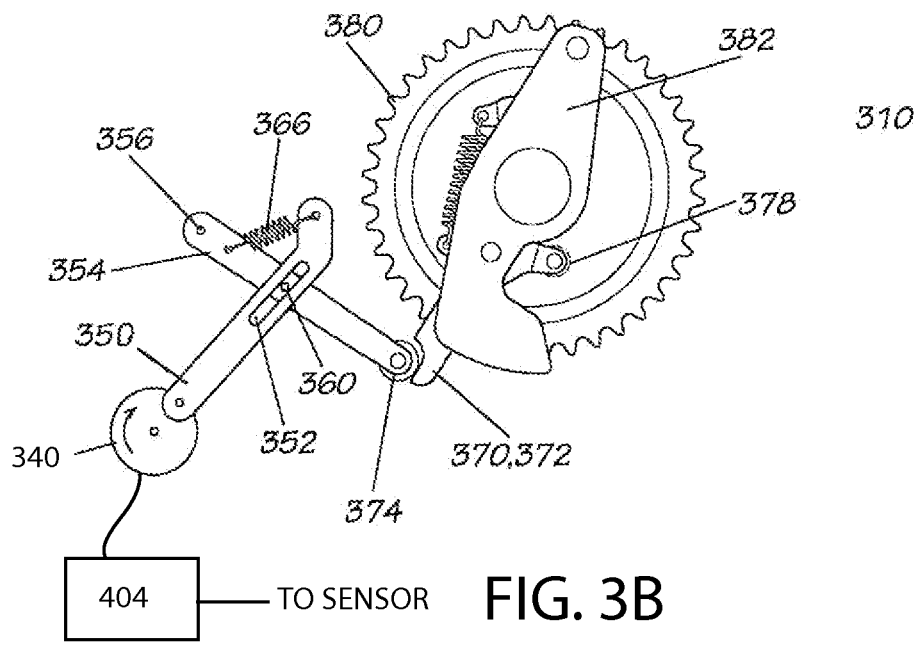

The stuffer 142 thus loads a charge into the baling chamber 112 and the plunger 114 packs the charge rearwardly against previously compacted materials and, in so doing, incrementally moves the entire mass of crop materials to form a bale. The crop material delivered to the stuffer chute may be loaded into the baling chamber by the stuffer 142 which may periodically traverse the stuffer chute 122. As shown in FIGS. 3A-3B, a stuffer clutch assembly 310 may be used for actuating the stuffer 142 to sweep the charge into the baling chamber 112. Thus, whereas the plunger 114 may be continuously reciprocating, the clutch 310 may be used to manage the mechanical actuation of the stuffer 142 as desired. The clutch may be similar to that disclosed in U.S. patent application Ser. No. 12/645,174 and U.S. Pat. No. 4,106,268, both of which are incorporated by reference in their entirety herein.

In an example embodiment, a mechanical linkage may be used to sweep the charge from the stuffer chute 122 into the baling chamber 112. The linkage of the stuffer clutch assembly 310 may include a first arm 350 coupled at one end to a motor 340. A second arm 354 may be coupled to the first arm 350 and pivot at point 356. The first and second arms 350, 354 may be coupled together by a pin 360 in one of the first and second arms 350, 354 which is received in and slidably engages a slot 362 in the other of the arms 350, 354 so that a range of motion is provided to prevent the motor 340 from binding. A spring 366 may be coupled between the distal end of first arm 350 and a point in between the pivot 356 and the position along the length of the second arm 354 where the pin 360 engages the slot 362. In the home position of the stuffer clutch assembly 310, a notch 370 on an end of a trip arm 372 receives and retains a roller 374 on the distal end of the second arm 354.

When the assembly is activated and the motor 340 is energized, the point at which the first arm 350 is coupled to the motor 340 begins to rotate and the roller 374 of the second arm 354 is released from the notch 370 of the trip arm 372. Another roller 378 at the opposite end of the trip arm 372 then engages the inner diameter of a rotating sprocket 380. Revolution of the motor 340 releases the roller 374 from the notch 370 so that the trip arm 372 engages the sprocket 380 which in turn rotates a clutch pawl 382 of the stuffer clutch assembly 310 to put a stuffer arm 384 in motion, and then returns the stuffer clutch assembly 310 to the home position with the roller 374 of arm 354 received in notch 370. In an alternative embodiment, a hydraulic cylinder or other means may be used instead of the motor 340. The hydraulic cylinder can be extended in order to move the arms 350, 354 and release the roller 374 from the notch 370 of the trip arm 372.

Figure 4:
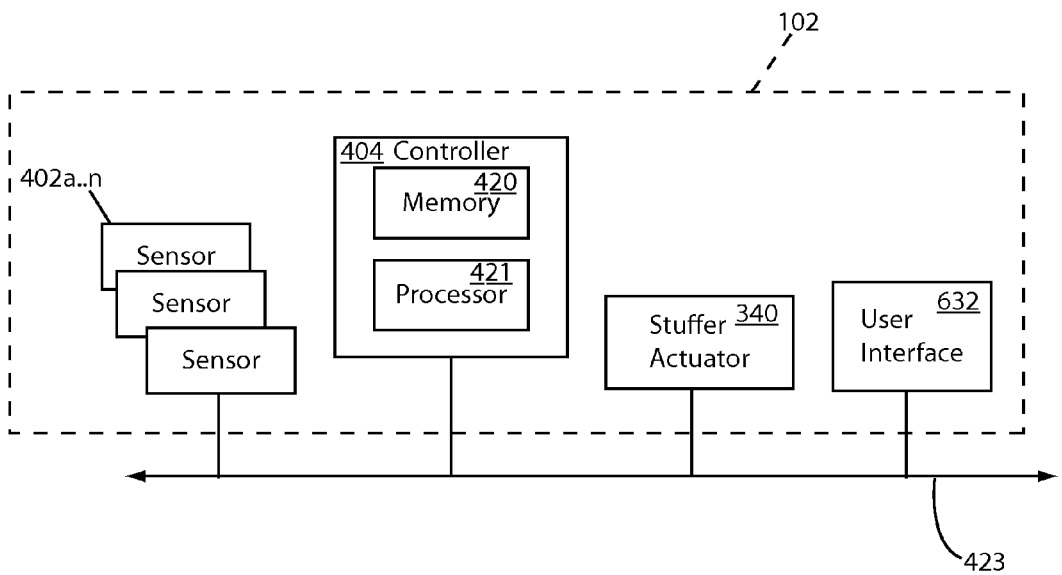
FIG. 4 shows a block diagram of a smart stuffer system in accordance with an example embodiment of the invention.

As shown in FIG. 4, a smart stuffer system 102 may include one or more charge sensor 402a-n and a controller 404 configured to manage the charge in the stuffer chute 122. The charge sensor 402 may be configured to determine one or more characteristics of the charge within a stuffer chute 122 and the controller 404 configured to actuate the stuffer 142 in response to the characteristic in accordance with a predetermined scheme. In the example embodiment shown in FIG. 4, the smart stuffer system 102 may include one or more charge sensors 402 installed in the walls 410 (FIG. 5) of the stuffer chute 122 to sense various characteristics of the charge within the stuffer chute 122. This information can be sent to the controller 404 which determines whether the stuffer 142 should be tripped to send the charge into the baling chamber 112.

In the example embodiments, the actuation of the stuffer fork 412 (FIG. 2) may be controlled by the controller 404 in accordance with a predetermined scheme. For example, using the characteristic determined by the charge sensor 402 the controller 404 may determine when the stuffer 142 should be tripped. When the controller 404 does determine that the stuffer 142 should be tripped, the controller 404 sends a command signal to the actuator, such as the clutch motor 340, to trip the linkage of the stuffer clutch assembly 310 so that the stuffer fork 412 sweeps the charge into the baling chamber 112. For example, the controller 404 could send a signal to actuate the motor 340 of the clutch assembly 310.

The controller 404 may be hardware, software, firmware, or a combination thereof. In the example embodiment shown in FIG. 4 the controller 404 includes a processor 421 for executing instructions and a memory 420 for storing various data and commands. For example, the memory may include a predetermined scheme for execution by the processor. While shown as a separate element the controller 404 could be part of a larger unit such as a main bale controller or another module. For example, the controller may be part of, or communicate with, a main baler controller which is used for controlling other aspects of the baler such as chamber pressure. The controller 404 may be configured to communicate with other components, such as the sensors 402, the actuator 340, and the user interface 632 via a CAN bus 423 as known to one of ordinary skill in the art.

In one or more embodiments, in order to trigger the stuffer 142, two conditions are met. First, the stuffer arm 384 of the stuffer 142 is in the home position as shown in FIG. 3. A contact switch or position sensor may be used to detect when the stuffer arm 384 is in the home position. Second, a command signal from the controller 404 is received by the actuator 340. When both of these conditions are met, the motor 340 turns allowing the roller 374 to drop off and fire the stuffer 142. After triggering, the trip arm 372 may return to a recessed position with its roller 374 retained in the notch 370. Once the stuffer 142 leaves its home position, the motor 340 may reset the stuffer clutch assembly 310 to neutral and awaits the next occurrence when both conditions are met again. After the stuffer 142 transfers the charge to the baling chamber 112, the process repeats and the sensor 402 senses the next charge in the stuffer chute 122.

Any suitable sensor may be utilized to detect characteristics of the charge within the stuffer chute 122 and send corresponding signals to the controller 404, such as a load cell or the like. In one example embodiment shown in FIG. 5 the sensor 402 may be an angular sensor, such as a potentiometer sensor available from Radio Shack that includes a rotatable extension member 502 that extends through a sidewall 410 of the stuffer chute 122 so that it is contacted by the charge in the stuffer chute 122. As additional crop material is packed into the stuffer chute 122 the extension member 502 rotates to indicate the presence of more crop material. For example, the sensor 404 may determine a pressure generated by the charge within the stuffer chute 122 to give an indication of the density of the charge such as a percentage fill. As explained in more detail below, the use of multiple sensors 402 may provide additional information such as the particular shape of the charge within the stuffer chute 122. Information from the sensors 402 may be conveyed to the controller 404 which determines an appropriate action. The particular action may be determined in accordance with a predetermined scheme employed by an operator.

Figure 5:
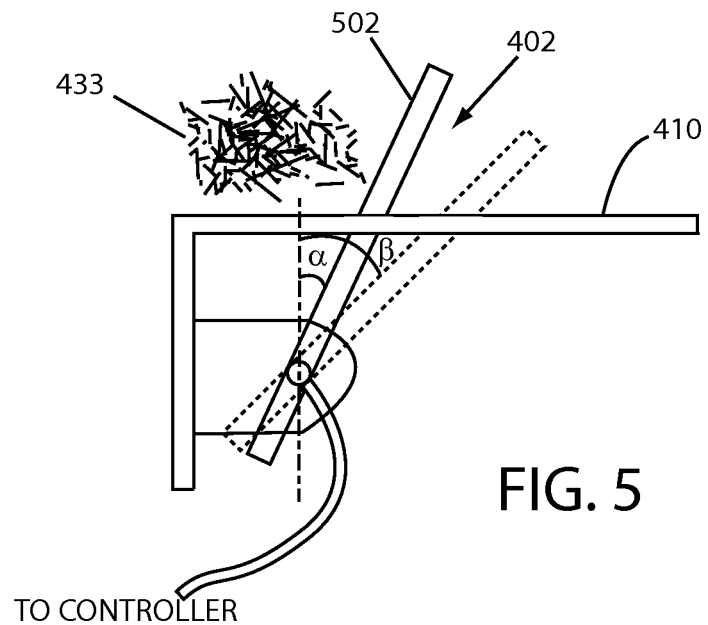
FIG. 5 shows an example embodiment of a sensor for use with a smart stuffer mechanism.

As shown in solid lines in FIG. 5, as crop material 433 is stuffed into the stuffer chute the extension member 502 of the angle sensor 402 is rotated about a pivot point P to an angle $\alpha$ from a reference origin L. As additional crop material is stuffed into the chute, the extension member 502 is forced to rotate further about the pivot point P to an angle $\beta$. The angle sensor 402 may be configured to send a signal to the controller 404 regarding its angular position to determine characteristics of the charge. For example, the angular sensor 402 may be calibrated such that a particular angle of the extension member 502 can be associated with particular characteristics of the charge. For example, when the extension member 502 is positioned at a particular angle, the density or pressure of the bale may be determined as well as a fill level of the stuffer chute. For example, at angle $\alpha$ of the extension member may be associated with a density of 0.5 $lb/ft^3$ or pressure of 3 psi and a charge fill level of 50% of capacity. When the extension member is at an angle $\beta$, this may correspond to a density of 1.0 $lb/ft^3$ or pressure of 5.5 psi and a charge fill level of 82%. It should be noted that the angle-to-pressure ratio may not necessarily be linear and that the particular relationship may be determined through appropriate testing.

The data collected by the sensor 402 may be sent to the controller 404 for processing. For example, the sensor 402 may send the angular value of the angular sensor 402 via a signal to the controller 404 for use in the various schemes employed by the controller 404. The various relationships between the charge sensor data and the resulting charge characteristics may be stored in memory and retrieved by the controller 404. This sensor information can be used by the controller 404 to determine what action should be taken with respect to the stuffer 142.

The particular action of the controller 404 may depend upon the value provided by the sensor 402 and the particular scheme employed by the controller 404. For example, where the extension member 502 of the angular sensor 402 is in the $\alpha$ position (shown in solid lines in FIG. 5), this may correspond to a 50% fill level in the stuffer chute 122. Under a first scheme, the controller 404 may send a trip signal to the actuator 320 only if the charge is at a fill level of 80% or greater. In that case, the stuffer 142 would not be actuated. As more crop material is added to the charge, the extension member is moved to angle $\beta$ (shown in dashed lines in FIG. 5), which corresponds to a charge level of 80% of capacity, in which case the controller 404 sends an appropriate command signal to trip the stuffer 142. As mentioned above, although the actuator is shown as a motor, other actuators could be used, such as by way of example and not limitation, an electronic solenoid or a hydraulic cylinder.

In one example embodiment the controller 404 may determine an expected future value for a characteristic of the charge in the stuffer chute 122 and use this information to determine an appropriate action. For example, the controller 404 could determine a present value of a characteristic of the charge and an expected future value of the characteristic. In an example embodiment, the present and future values are values associated with a present open window for actuating the stuffer and the next future window for actuating the stuffer. For example, information could be continuously collected as to how a characteristic of the charge is changing over time. Using this information an estimate may be made as to the future value of the characteristic. This approach allows the stuffer 404 to take into account additional information to allow for more effective actuation. For example, a particular scheme used by the controller could take into account minimum and maximum desired values of a characteristic. For example, a user may indicate that it is desirable to trip the stuffer when the fill level is greater than or equal to an 80% but to ensure that the maximum fill is no greater than 120%. Under this scenario, if a present charge is at 70% fill and the charge is increasing at 30% per available window, the controller could estimate that a future charge would be at 100% fill level. On the other hand, if the charge is increasing at 70% per open window then the future charge may be estimated at 140% fill level.

The particular scheme employed by the controller could take into account both the present and future fill values in determining whether to trip the stuffer. In the examples above, the controller may wait for the next window so that the charge is greater than 80% fill level before tripping and continues to receive crop material to reach the 100% fill level. Under the second scenario, however, even though the charge has not reached a desired minimum 80% fill level, to avoid overstuffing the stuffer chute to a 140% fill level, the controller trips the stuffer. Various algorithms may be developed for estimating a future value of the charge such as averaging a fill level delta for the previous three flakes or otherwise interpolating from previous data.

Under another scheme, a minimum value, an optimal value, and a maximum value may be used in determining an appropriate action. For example, the scheme may look at a current charge value and determine whether a future expected value, such as the value expected at the next open window, is closer to the optimal value than the present value. If not, then the controller 404 could trip the stuffer as the present charge value is more desired than the expected future value. If the future expected future value for the next open window is closer to the optimal value, then the controller would not trip the stuffer at the present charge level but instead allow additional crop material to be added to the charge. For example, where the present value is at 90% fill level and the expected future value is at 100% fill level the future value is more desirable than the present value so the stuffer 142 is not tripped. A maximum value could also be used, such that even if the future expected value is closer than the present value, the stuffer would be tripped if the expected future value is greater than the maximum desired value.

One advantage of this arrangement is that the controller 404 can employ various schemes which may be easily selected by an operator. As shown in FIG. 4, a user interface 632 may be provided to allow an operator to easily change the various stuffer schemes. The memory 420 may be used to store such schemes for retrieval and use by the processor 421 of the controller 404. For example, depending upon the particular scheme employed, different characteristics could be measured for different crops and different values of the characteristics could be used in determining what action is to be taken by the stuffer. For example, a user may want a scheme with different maximum and minimum trip values depending upon the particular crop being baled. Furthermore, as described in more detail below, a user input means may be provided to allow an operator to select the different schemes and input different characteristics to control actuation of the stuffer that is not available in the prior art. For example, an operator may easily change the minimum trip requirements from 80% to 70% or a maximum value from 120% to 130% if desired. Tables could also be stored in memory 420 for retrieval and particular default schemes may be provided for different crops, in selecting a scheme for use by the controller.

Figure 6:
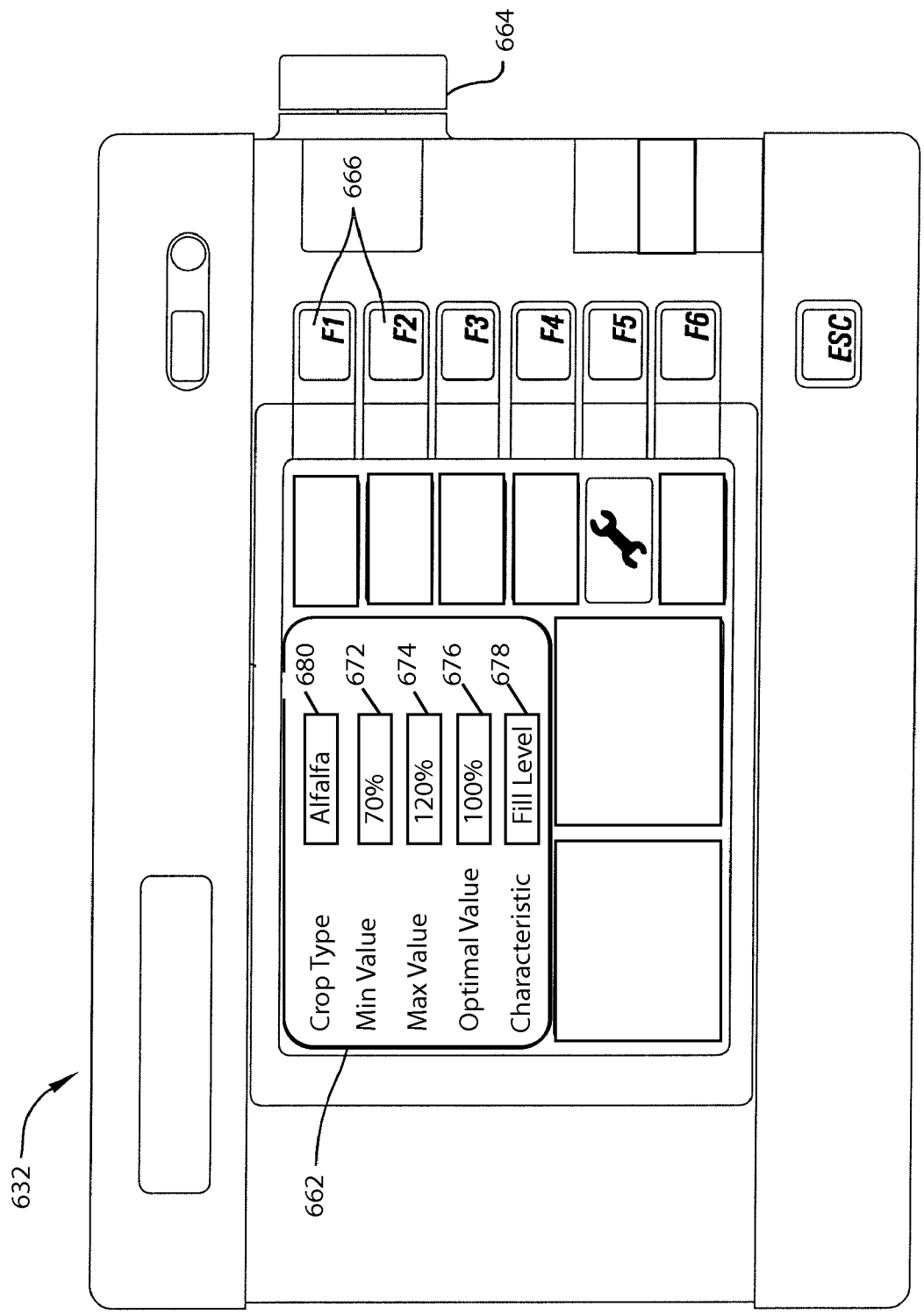
FIG. 6 shows an example embodiment of a user interface for use with a smart stuffer system.

FIG. 6 shows an example embodiment of a user interface 632 that may be configured to receive inputs from an operator and to set a desired stuffer scheme for use by the controller 404. The controller 404 and user interface 632 may be compatible with ISO 11783 and other standards so as to be usable with any implement used with the tractor or other towing vehicle. The controller 404 may be programmed with a computer program comprising an ordered listing of executable instructions for implementing logical functions. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device.

The user interface 632 may be similar to that used by a bale size sensor in US Publication No. 2008/0087177 which is entirely incorporated by reference herein. As best illustrated in FIG. 6, a preferred embodiment of the user interface 632 includes a display screen 662, a control knob 664, a plurality of function keys 666 or other inputs, and an internal controller, processor or other control device. The user interface 632 may be connected to the tractor key switch so that it automatically turns on when the tractor key is used to start the tractor. The control knob 664 may allow the operator to scroll through the functions shown on the display screen and select one of the functions when the knob is pressed. The function keys 666 enable a displayed function or cause display of another screen. The particular operation or function of each function key is determined by software and can be changed.

Figure 7:
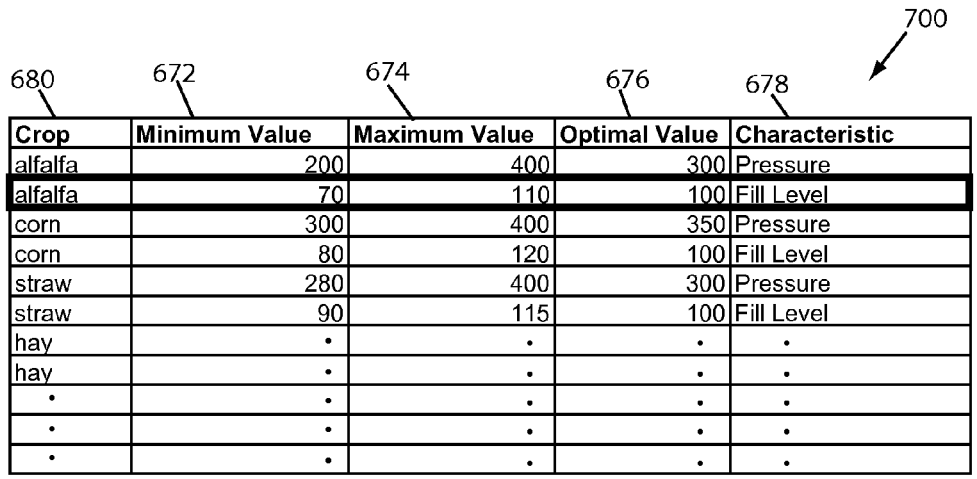
FIG. 7 shows an example embodiment of a user interface for use with a smart stuffer system.

FIG. 7 shows a table 700 from which a user may select a minimum value 672, a maximum value 674, and an optimal value 676 for a charge characteristic, such as fill level, to be used by the controller 404 in manipulating the stuffer 142. A user may also select a crop type 680. The particular settings could be stored in memory, such as a memory 420 (FIG. 4) associated with the controller 404 so that prior inputs can be retrieved. Various tables could be displayed to allow a user to scroll through and select a desired value.

Figure 8:
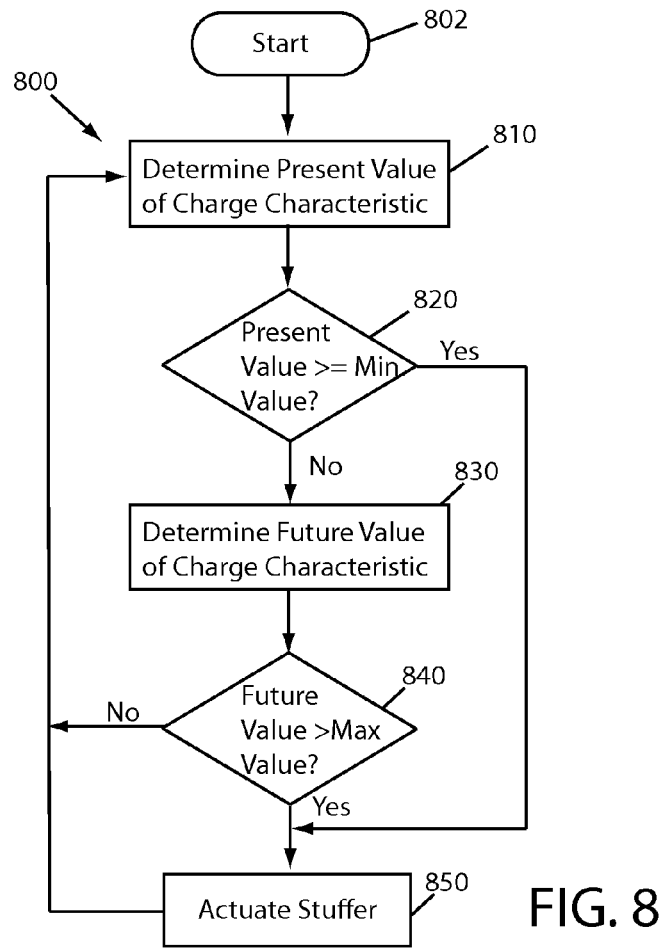
FIG. 8 shows an example method of the invention for operating a smart stuffer mechanism.

FIG. 8 shows an example method 800 in which a first scheme is used which employs a desired minimum and maximum value. At block 810 a present value of a characteristic of the charge in the stuffer chute 122 is determined. For example, an angular sensor 402, or other sensor, may be used to detect a pressure in the stuffer chute 122 and this information may be used by the controller 404 to determine a fill level of the stuffer chute 122. At block 820 a decision is made as to whether the present value is greater than a desired minimum value. If so, then the stuffer is tripped at block 830 so that the charge is swept into the baling chamber and the process begins again at block 810 for the next charge.

If the value in block 820 is less than the desired minimum value, then at block 840 an expected future value of the characteristic is determined. For example, the controller 404 may determine an expected flake level at the next window for tripping the stuffer by using previously collected data, such as the increase in flake level between previous windows. At block 850 a decision is made as to whether the expected future value is greater than a desired maximum value. If so, then the stuffer is tripped at block 860. If not, then the process returns to block 810 so that additional crop material is gathered in the stuffer chute.

Figure 9:
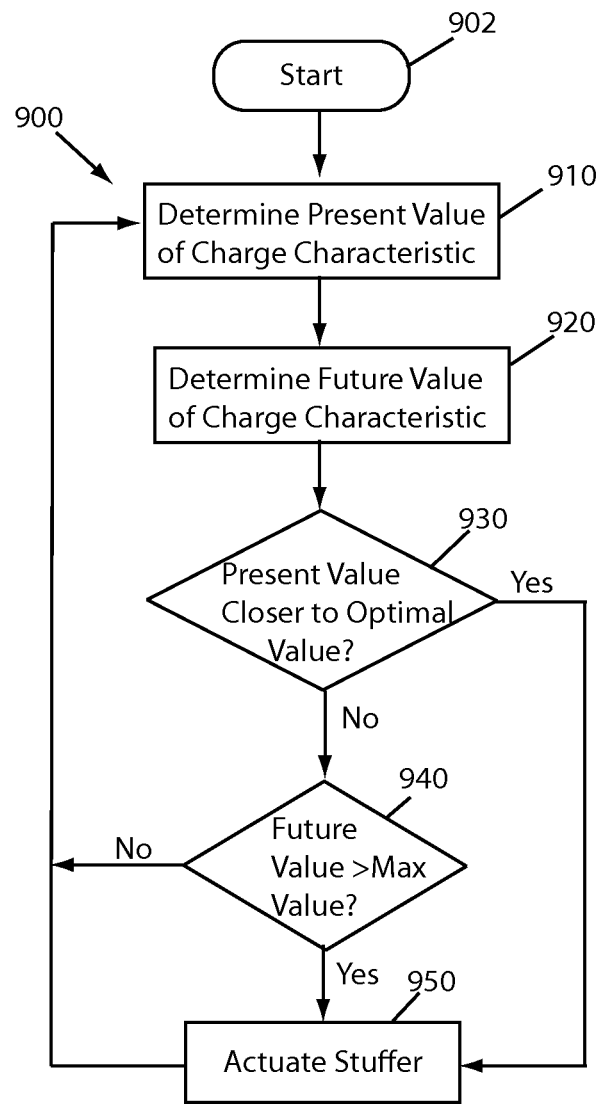
FIG. 9 shows another example method of operating a smart stuffer mechanism.

FIG. 9 shows an example method 900 in which the scheme used by the controller considers a minimum value, an optimal value, and a maximum value. At block 910 a present value of a characteristic of the charge is determined, such as a present pressure value in the stuffer chute. At block 920 an expected future value of the characteristic is determined. For example, an expected future pressure in the stuffer chute at the next open window for tripping the stuffer. At block 930 a decision is made as to whether the present value is closer to the optimal than the future value. If yes, then the stuffer is tripped at block 950. If no, then at block 940 a decision is made as to whether the expected value is greater than the maximum value. If so, then the stuffer is tripped at block 950, otherwise the process repeats at block 910.

Another object of the present invention is to provide the operator with information about a charge in the stuffer chute, such as by way of example and not limitation, a charge size and shape, and assist the operator in determining when uneven loading or undesirable packing of the stuffer is taking place, and of doing so essentially contemporaneously with the occurrence of such uneven or undesired packing. This may allow an operator to take corrective measures, such as adjusting wrappers on the stuffer chute, or taking corrective steering measures before the problem becomes serious enough to adversely affect bale quality. In this respect, the present invention contemplates a monitoring system which checks the characteristics of the charge in the stuffer chute and provide real time and continuous data to a user. In an example embodiment, the information is provided to a user via a display that indicates one or more characteristics of the charge. In one example embodiment, an indicator may indicate a pressure level at one or more points in the stuffer chute. In another example embodiment, a display may show the shape of the charge.

Figure 10:
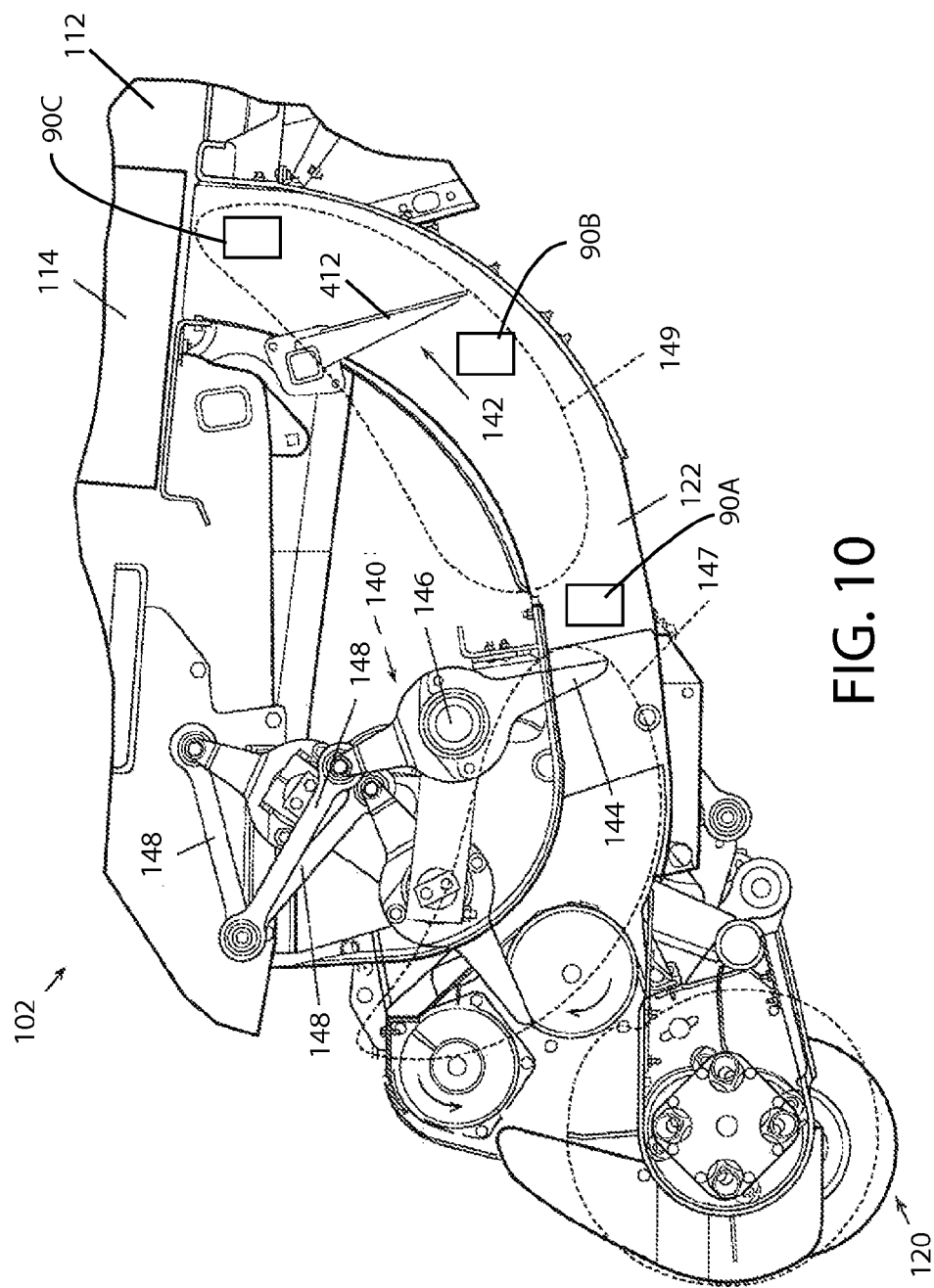
FIG. 10 shows a side view of an example embodiment of a smart stuffer mechanism employing a plurality of sensors.

As shown in FIG. 10, a plurality of sensors 90*a-n* may be used to determine various characteristics of the charge within the stuffer chute 122. The sensors 90 may be positioned in various places along the sidewall of the stuffer chute 122. In an example embodiment, a total of six sensors, three sensors 90A, 90B, and 90C along each sidewall 410 of the chute 122. The sensors 90 may be located near a bottom, center, and top of the stuffer chute.

Figure 11:
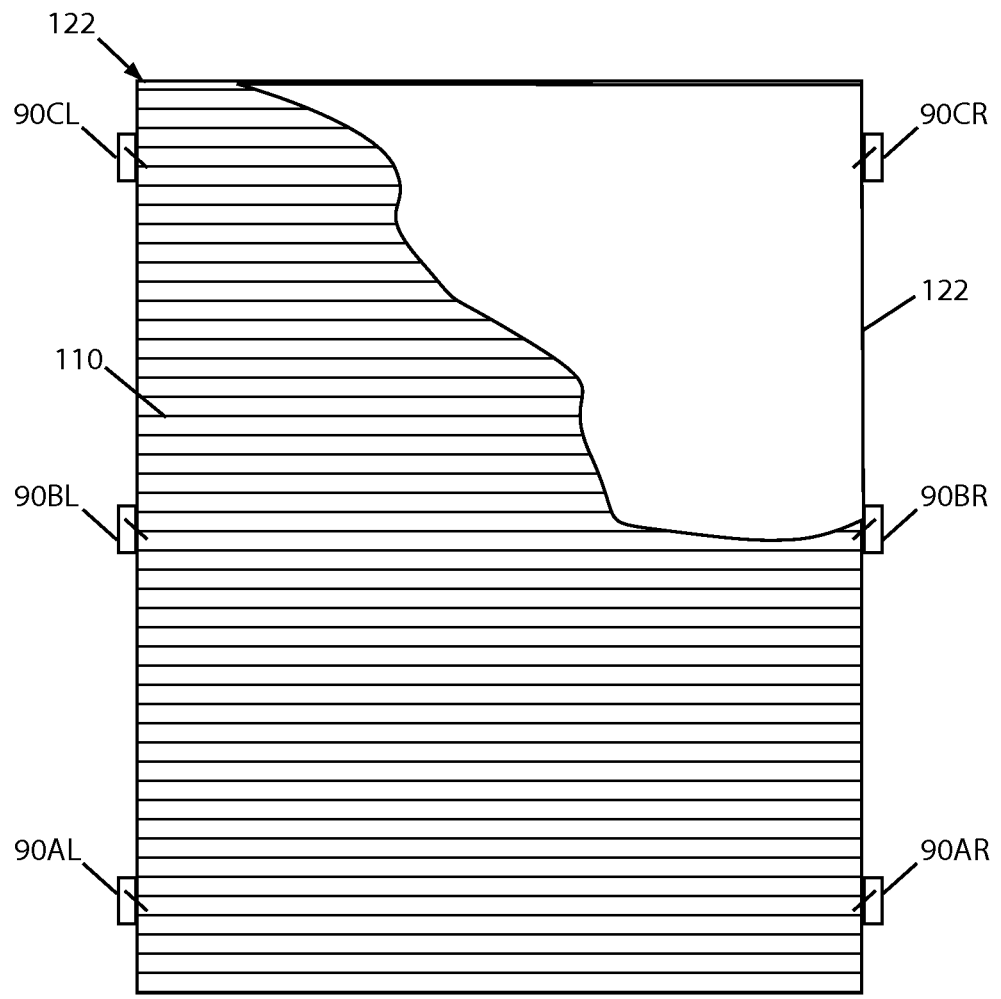
FIG. 11 shows a top plan view of an example embodiment of a stuffer chute have a charger therein.

FIG. 11 shows a top plan view of the stuffer chute 122 having a non-uniform shaped charge. As previously mentioned, a variety of different sensors may be used, but for purposes of illustration the angle sensors 90 previously discussed are shown in the example embodiments so as to measure a pressure of the charge at each sensor location.

Due to the non-uniform nature of the charge shown in FIG. 11, the different sensors will detect different pressure levels.

For example, each of the left sensors 90AL, 90BL, and 90CL are in contact with the charge larger pressures will be detected than at the right side sensors 90AR, 90BR, 90CR which are in less contact with the charge. This data can then be provided to an operator to alert the operator of the nonuniform bale and prompt the operator to take corrective action.

Figure 12:
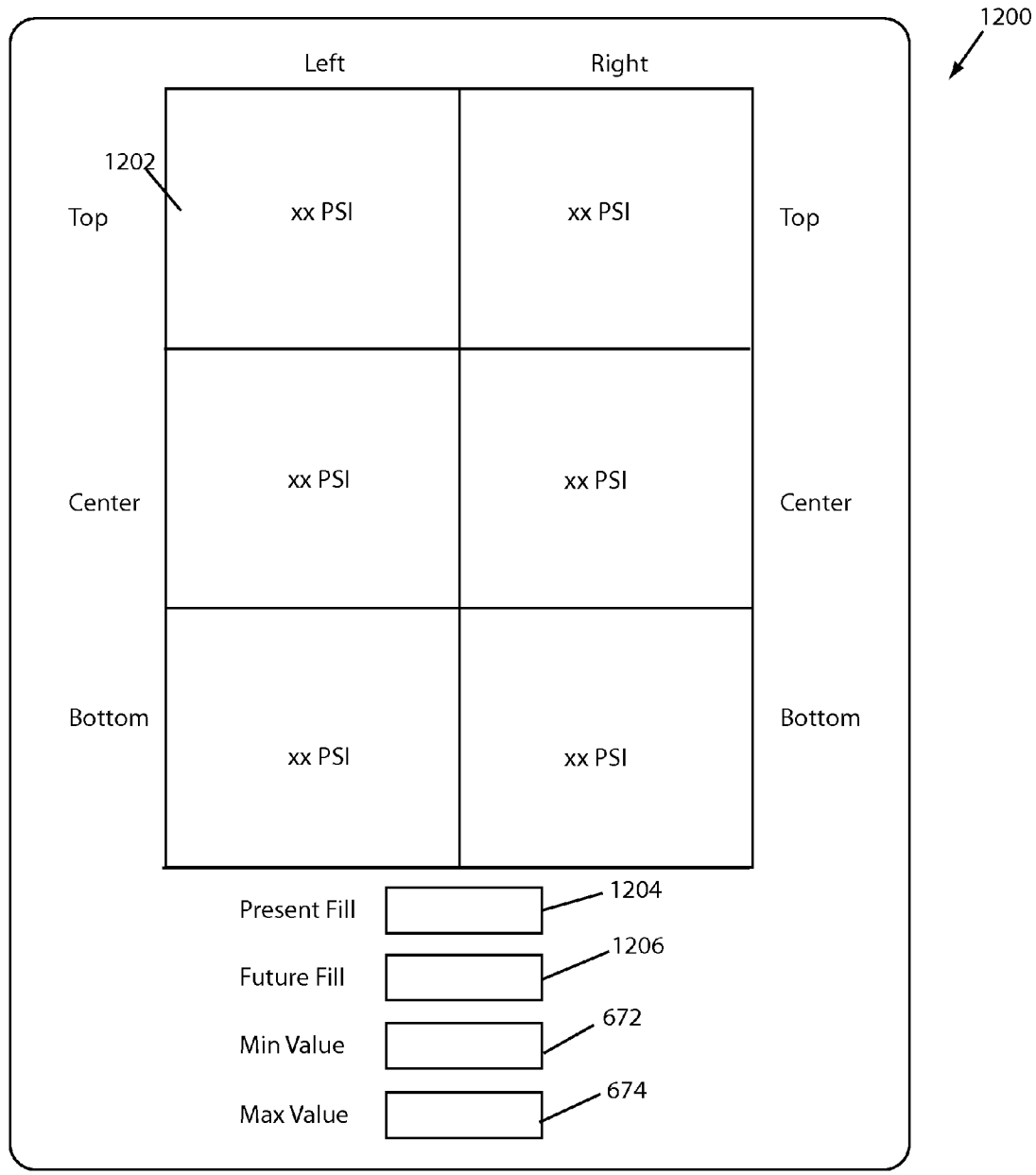
FIG. 12 shows an example embodiment of a display in table format that may be used with a smart stuffer mechanism.

The sensor data may be provided to a user in a variety of different formats. In one embodiment shown in FIG. 12, the data is shown in a display 1200 in table form in which values of the characteristic sensed by each sensor 90 is presented. In this example a pressure value 1202 is provided for each area covered by the sensors 90A-C. This allows an operator to determine the uniformity of the charge. For example, if one area has a much lower psi than another area, this is an indication of a non-uniform charge density. This information can then be used by the controller 404 to actuate the stuffer in response to a particular predetermined scheme employed. Various values may also be computed and displayed. For example, a present fill level 1204, a future fill level 1206 may be determined by the controller 404 and displayed. In addition, the values of the minimum 674 and maximum values 672 may be displayed.

Figure 13:
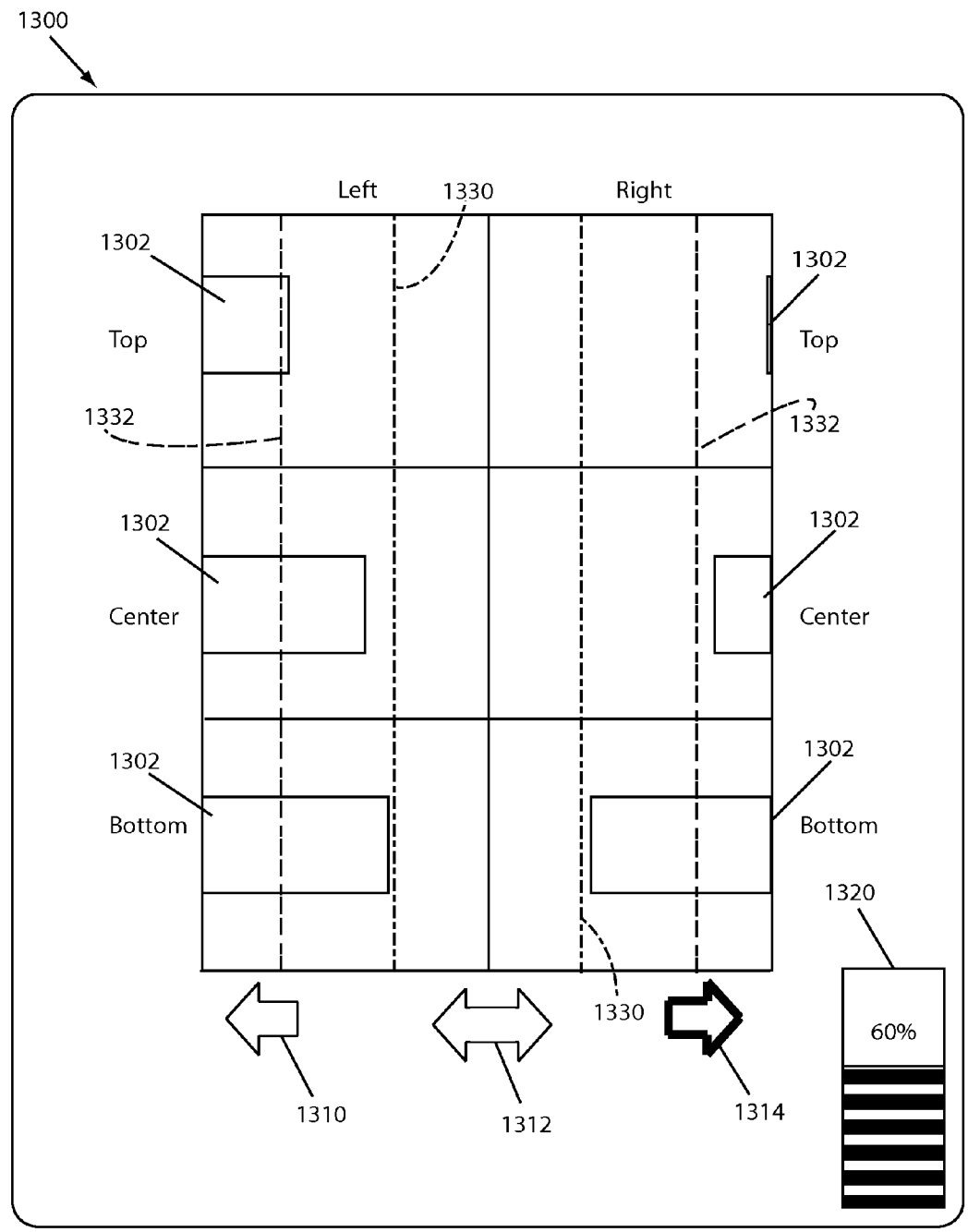
FIG. 13 shows an example embodiment of a display in bar graph format that may be used with a smart stuffer mechanism.

FIG. 13 shows another embodiment of a display 1300 in which information is provided in bar chart form in which the pressure values 1302 for each sensor 90 are shown extending horizontally to a center point. The display may include indications of predetermined levels 1330, 1332 and how the detected levels, shown by bar indicator 1302, compare. This information allows an operator to determine the characteristics of the charge continuously and in real time. This data assists an operator in discovering a potential problem with the charges prior to the completion of a bale. In another embodiment, the average values for the last several flakes may be used to determine a trend. If the apparatus is in heavy windrows the data may occur rapidly and a general trend may be used to determine the proper settings rather than individual readings.

The display may also suggest corrective action that should be taken by an operator, such as whether the operator should approach a windrow differently. For example, the display 1300 may indicate when one sensor value is considerably lower than a corresponding sensor. For example, an alert may be provided is a left sensor has a value that is greater than a predetermined % of the value provided by a corresponding right sensor. This would be an indication of an uneven charge. This data may repeat from flake to flake due to error in driving or settings so that an average of such values may be used.

The display could receive data directly from the sensors for display or signals from the controller which could receive data from the sensors, manipulate the data as needed and send corresponding signals to the display due to a problem that is repeating. For example, the controller 404 may analyze the sensor data and command the display to indicate a recommended corrective action to be taken by the operator. For example, the controller could analyze the charge shape and recommend adjustment of one or more wrappers on the stuffer chute. The controller 404 could also determine an adjustment to the driving characteristic of the operator such as a suggestion to steer left or right to provide more crop material to a particular portion of the stuffer chute. For example, a left 1310, center 1312 and right 1314 arrows may be provided to the display in FIG. 13 to indicate that the operator may want to increase the size of the bottom wrapper of the stuffer chute and/or steer to the right to cause more crop material to be sent to a particular area of the stuffer chute. Alarms could also be used such as turning as manipulating the visual characteristics of the display to alert the operator of a problem. For example, the indicator for the lower right sensor may be shown in red to show that the associated value is at an undesirable level due to a persistent problem. The controller 404 analyzes the sensor data to provide additional information. For example, an indication of the flake level 1320 may be.

Figure 14:
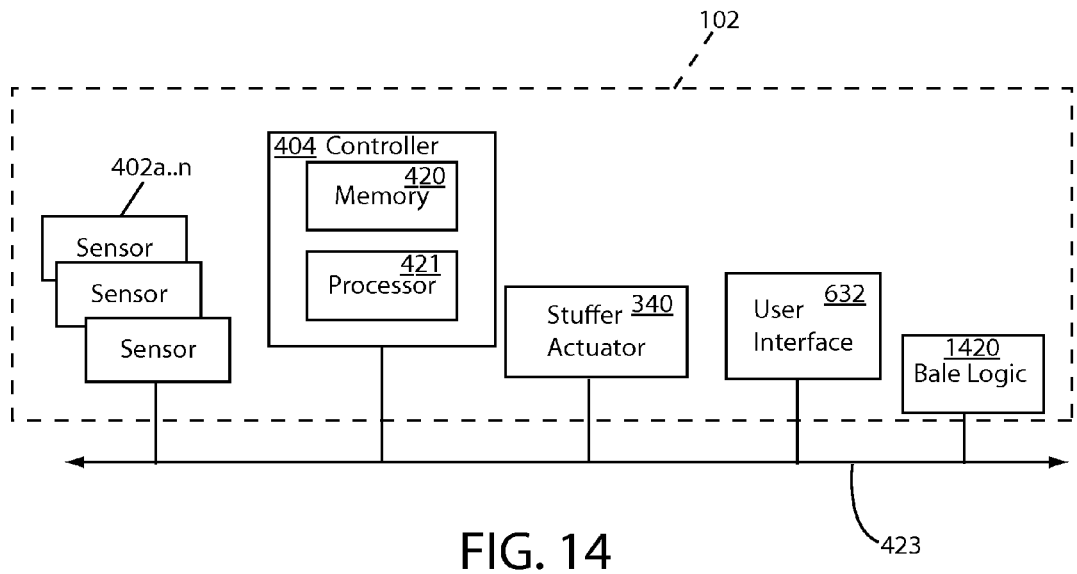
FIG. 14 shows an example embodiment of a smart stuffer system of the invention.

Another advantage of the present invention is that it may be used in conjunction with other baler components to manipulate the stuffer in a desirable manner. For example, as shown in FIG. 14, in balers that have sensor for detecting a characteristic of a bale in a baling chamber, such as a bale length logic sensor 1420. The controller 404 may be communicatively coupled to the bale sensor 1420 so as to receive data concerning the bale in the baling chamber 112. This additional data could be used in a scheme to manipulate the stuffer 142. For example, a bale length logic sensor 1420 may indicate that a bale presently in the baling chamber 112 is close to a desired overall length and that a charge of a small size may be desired to form a bale of the desired length. In that case, the controller 404 may manipulate the stuffer 142 so that a charge of the desired size is provided and a bale of a desired length is formed. For example, the bale length logic may indicate that a flake of 30% of normal length would be desirable. In that case, the controller 404 may instruct the stuffer to prepare a charge of 30% normal size by changing the minimum charge value or optimal charge value of a particular scheme employed by the controller. This arrangement is especially useful in forming bales of accurate length and density. For example, a determination is made as to whether to trip now or wait to achieve a bale of a desired length.

Various algorithms could be used to determine the desired charge size. For example, the relationship between a charge size provided to the baling chamber 112 and the resulting increase in the bale length could be determined. For example, previous values for a charge size may be provided by the stuffer chute sensors that could be associated with the resulting increase in bale length provided by the bale length logic. A resulting relationship could then be determined. For example, a charge size of 100% may correspond to a resulting compress increase in bale length of 3.5 inches. The current bale length may be monitored and the present bale length may be compared with a desired bale length to determine what incremental bale length should be added to achieve the desired length. The corresponding charge size to provide the desired additional bale length could then be determined from the relationship of the charge size and bale length. For example, to achieve an additional bale length of 4 inches it may be determined that a charge/flake size of 4 inches would be desired. This desirable charge size could then be used as the optimal size of charge, a minimum value, or a maximum value in the scheme used by the controller 404.

Figure 15:
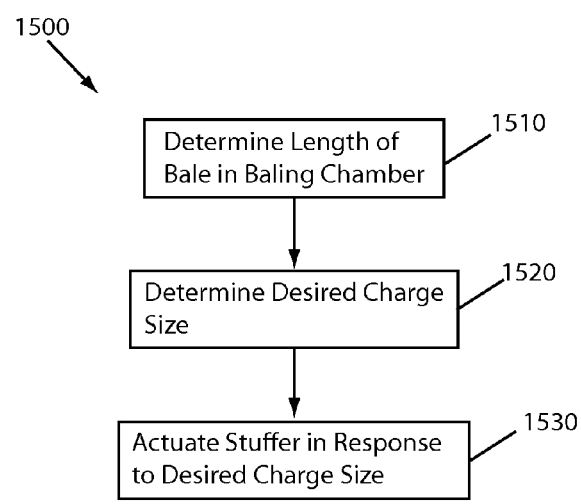
FIG. 15 shows a flow diagram of an example method of the invention.

FIG. 15 shows an example method 1500 for controlling a stuffer. At block 1510 a determination is made as to the length of the bale in the baling chamber 112. At block 1520 a desired charge size is determined. As discussed above this determination could be made by the controller 404 using previous bale length and charge size data. At block 1530 the stuffer may then be actuated in response to the desired charge size.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exem-

What is claimed is:

1. An apparatus for actuating a stuffer of a stuffer chute to sweep a charge of hay into a baling chamber of a hay baler, the apparatus comprising:
   a sensor configured to determine a pressure characteristic of a charge within a stuffer chute representative of an amount of hay in the charge;
   a user interface configured to receive a predetermined scheme for actuating a stuffer associated with the stuffer chute; and
   a controller configured to actuate the stuffer in accordance with the predetermined scheme, wherein the controller receives a present value of the pressure characteristic of the charge in the stuffer chute from the sensor and calculates an expected future value of the pressure characteristic of the charge and then determines whether the expected future value of the pressure characteristic of the charge in the stuffer exceeds a desired maximum value and actuates the stuffer to sweep the charge into the baling chamber when the expected future value of the pressure characteristic exceeds the desired maximum value and before the present value of the pressure characteristic exceeds the desired maximum value.

2. The apparatus of claim 1, wherein the user interface is configured to receive a desired minimum value and a desired maximum value of the characteristic.

3. The apparatus of claim 1, wherein the controller determines the expected future value of the characteristic of the charge by calculating a change in the present value of the characteristic of a charge in the stuffer chute over time.

4. A method for actuating a stuffer of a stuffer chute to sweep a charge of hay into a baling chamber of a hay baler, the method comprising:
   determining with a sensor a present value of a pressure characteristic of a charge in the stuffer chute representative of an amount of hay in the charge;
   calculating with a controller an expected future value of the pressure characteristic of the charge;
   determining with the controller whether the expected future value of the pressure characteristic of the charge in the stuffer exceeds a desired maximum value; and
   actuating the stuffer with the controller to sweep the charge into a baling chamber when the expected future value of the pressure characteristic exceeds the desired maximum value and before the present value of the pressure characteristic exceeds the desired maximum value.

5. The method of claim 4, wherein the controller determines the expected future value of the characteristic of the charge by calculating a change in the present value of the characteristic of a charge in the stuffer chute over time.

* * * * *